US011466611B2

(12) United States Patent
Ishikawa

(10) Patent No.: US 11,466,611 B2
(45) Date of Patent: Oct. 11, 2022

(54) VEHICULAR INTERNAL COMBUSTION ENGINE

(71) Applicant: TOYOTA JIDOSHA KABUSHIKI KAISHA, Aichi-ken (JP)

(72) Inventor: Masami Ishikawa, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 72 days.

(21) Appl. No.: 17/011,973

(22) Filed: Sep. 3, 2020

(65) Prior Publication Data
US 2021/0131345 A1    May 6, 2021

(30) Foreign Application Priority Data

Nov. 6, 2019   (JP) .............................. JP2019-201416

(51) Int. Cl.
| F02B 39/14 | (2006.01) |
| F01M 11/02 | (2006.01) |
| F01M 13/00 | (2006.01) |
| F01M 11/00 | (2006.01) |
| F01M 13/04 | (2006.01) |
| B01D 45/08 | (2006.01) |
| F01M 11/12 | (2006.01) |

(52) U.S. Cl.
CPC .............. *F02B 39/14* (2013.01); *B01D 45/08* (2013.01); *F01M 11/0004* (2013.01); *F01M 11/02* (2013.01); *F01M 11/12* (2013.01); *F01M 13/0011* (2013.01); *F01M 13/04* (2013.01); *F01M 2011/021* (2013.01); *F01M 2013/0461* (2013.01)

(58) Field of Classification Search
CPC .......... F02B 39/14; F02B 33/14; F02B 37/10; B01D 45/08; F01M 11/0004; F01M 11/02; F01M 11/12; F01M 13/0011; F01M 13/04; F01M 2011/021; F01M 2013/0461
See application file for complete search history.

(56) References Cited

U.S. PATENT DOCUMENTS

| 3,978,671 | A | * | 9/1976 | Gonzalez | ............... | F01M 11/08 |
| | | | | | | 184/6.24 |
| 6,305,168 | B1 | * | 10/2001 | Furukawa | ............... | F02B 75/22 |
| | | | | | | 60/605.1 |
| 2005/0109561 | A1 | * | 5/2005 | Chopra | .................. | F01M 11/12 |
| | | | | | | 184/103.1 |
| 2012/0279215 | A1 | * | 11/2012 | Roth | ........................ | F02B 37/02 |
| | | | | | | 60/599 |
| 2014/0298800 | A1 | * | 10/2014 | Bidner | .................... | F02B 39/14 |
| | | | | | | 60/602 |
| 2015/0167591 | A1 | * | 6/2015 | Sato | ................... | F01M 11/0004 |
| | | | | | | 123/403 |

FOREIGN PATENT DOCUMENTS

| JP | 2009150351 A | 7/2009 |
| JP | 201656710 A | 4/2016 |
| JP | 2018100608 A | 6/2018 |
| JP | 2018100608 A1 | 6/2018 |

* cited by examiner

*Primary Examiner* — Syed O Hasan
(74) *Attorney, Agent, or Firm* — Hauptman Ham, LLP

(57) ABSTRACT

A vehicular internal combustion engine is equipped with a supercharger, a drain pipe for draining lubricating oil in the supercharger, a cylinder block including a first oil passage, and a PCV separator including a second oil passage connected to an outlet of the drain pipe and an inlet of the first oil passage.

6 Claims, 4 Drawing Sheets

FRONT ←→ REAR

VEHICULAR INTERNAL COMBUSTION ENGINE

INCORPORATION BY REFERENCE

The disclosure of Japanese Patent Application No. 2019-201416 filed on Nov. 6, 2019 including the specification, drawings and abstract is incorporated herein by reference in its entirety.

BACKGROUND

1. Technical Field

The present disclosure relates to a vehicular internal combustion engine.

2. Description of Related Art

There is known a blowby gas treatment for treating unburnt gas (hereinafter referred to as blowby gas) that has leaked from a combustion chamber to a crankcase via a gap between a cylinder inner wall and a piston ring during the operation of an internal combustion engine, and returning the blowby gas to an intake system of the internal combustion engine (e.g., see Japanese Unexamined Patent Application Publication No. 2009-150351 (JP 2009-150351 A)). It is known that the blowby gas treatment is carried out through the use of an oil separation device (hereinafter referred to as a positive crankcase ventilation (PCV) separator) that separates an oil component contained in blowby gas (e.g., see Japanese Unexamined Patent Application Publication No. 2016-056710 (JP 2016-056710 A)). Besides, it is also known that the PCV separator is fixed and attached to an engine block through the use of bolts (see Japanese Unexamined Patent Application Publication No. 2018-100608 (JP 2018-100608 A)).

SUMMARY

As described above, the PCV separator is fixed and attached to the engine block through the use of the bolts. However, if the PCV separator is disconnected, it is desirable to make a driver of a vehicle aware that the PCV separator has been disconnected.

It is thus an object of the present disclosure to make the driver aware that the PCV separator has been disconnected.

A vehicular internal combustion engine according to the present disclosure is equipped with a supercharger, a drain pipe for draining lubricating oil in the supercharger, a cylinder block including a first oil passage, and a PCV separator including a second oil passage that is connected to an outlet of the drain pipe and an inlet of the first oil passage.

In the foregoing configuration, the PCV separator may include a separator chamber that separates an oil component from oil mist in blowby gas, and the second oil passage may be provided in a region that does not penetrate the separator chamber, separately from the separator chamber.

In the foregoing configuration, the lubricating oil may be oil for lubricating a bearing of the supercharger.

In the foregoing configuration, the vehicular internal combustion engine may further include a cylinder head that is placed on the cylinder block, and an oil feed pipe that is connected to a third oil passage provided in the cylinder head. The lubricating oil may be supplied from the oil feed pipe to the supercharger.

In the foregoing configuration, the vehicular internal combustion engine may further include an oil pan that stores the lubricating oil, and a sensor that detects an oil level in the oil pan. A malfunction indicator lamp arranged in an instrument panel of a vehicle may be lit when the sensor detects an abnormal oil level.

The present disclosure makes it possible to make the driver aware that the PCV separator has been disconnected.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Modes for carrying out the present disclosure will be described hereinafter with reference to the drawings.

Figure 1:
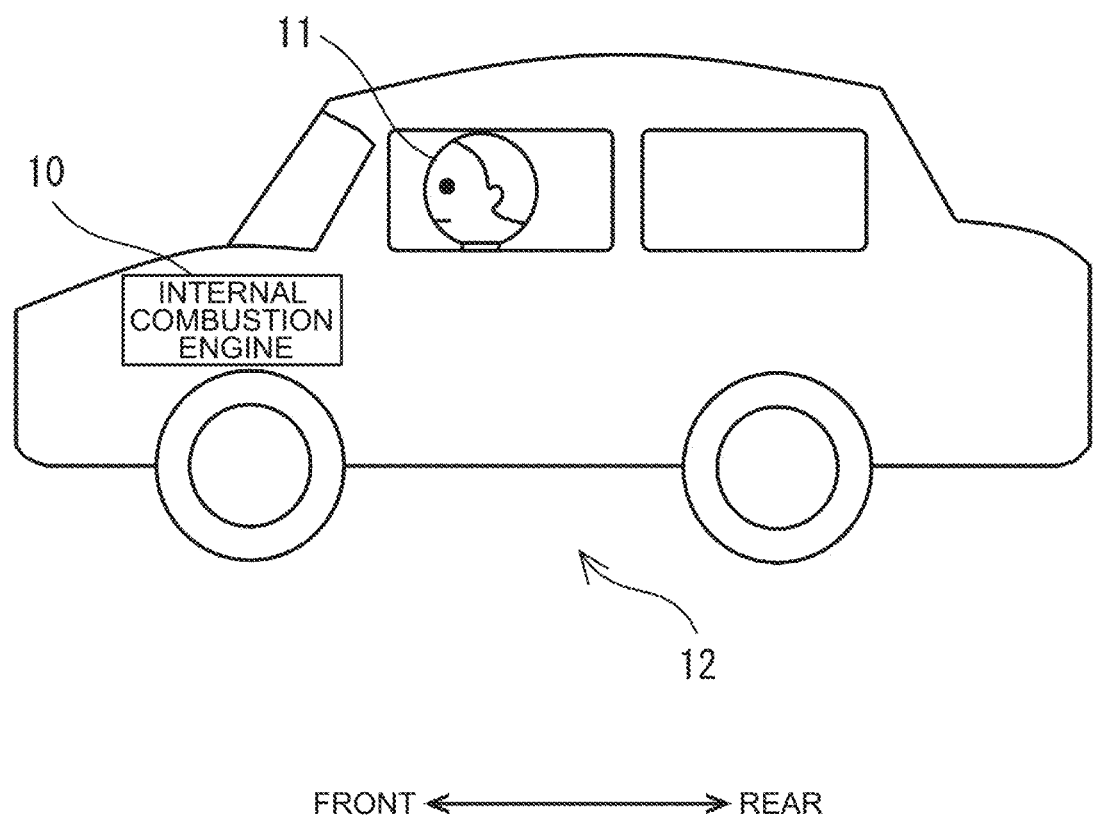
FIG. 1 is a view for illustrating a position where an internal combustion engine is mounted.
Figure 2:
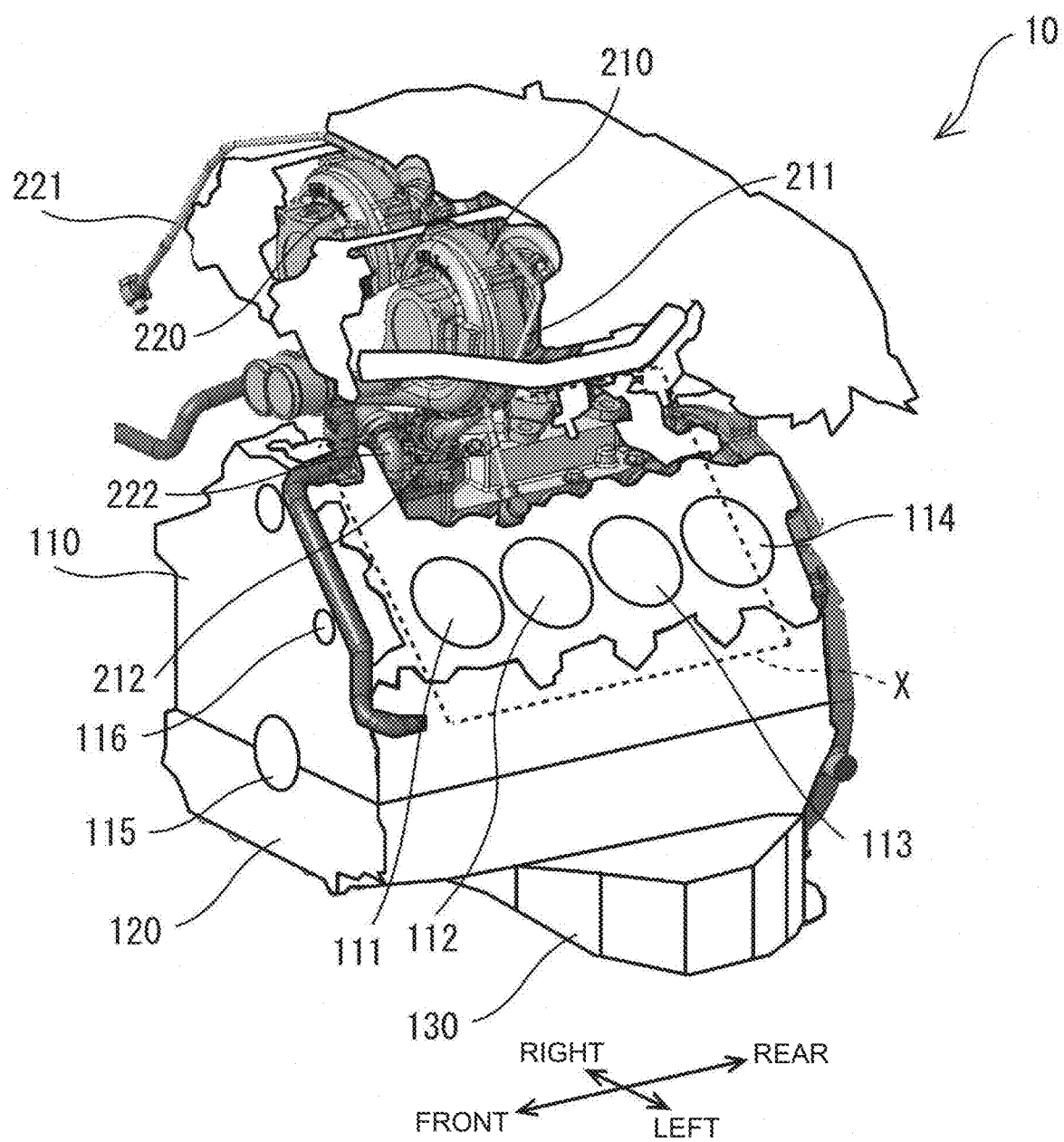
FIG. 2 is an exemplary perspective view of the internal combustion engine.

FIG. 1 is a view for illustrating a position where an internal combustion engine 10 is mounted. FIG. 2 is an exemplary perspective view of the internal combustion engine 10. As shown in FIG. 1, the internal combustion engine 10 is a vehicular internal combustion engine for use in a vehicle 12 in which a driver 11 can sit, and is mounted on a front side of the vehicle 12. More specifically, the internal combustion engine 10 is mounted in an engine room provided on the front side of the vehicle 12. As shown in FIG. 2, the internal combustion engine 10 is equipped with a cylinder block 110, a crankcase 120, an oil pan 130, and the like. Incidentally, in FIG. 2, the details of part of the cylinder block 110, the crankcase 120, and the oil pan 130 are omitted.

Four cylinders 111, 112, 113, and 114 are arranged in line on a left side of the cylinder block 110. Although not shown in FIG. 2, four cylinders are also arranged in line on a right side (on the other side of the sheet) of the cylinder block 110 in the same manner. The four cylinders 111, 112, 113, and 114 and the four cylinders (not shown) arranged on the right side of the cylinder block 110 are arranged in the shape of V. That is, the internal combustion engine 10 is a so-called V-eight engine.

Besides, an outlet 115 of a crankshaft formed by the cylinder block 110 and the crankcase 120, a drain port 116 for lubricating oil, and the like are provided on a front side of the cylinder block 110. Although not shown in FIG. 2, a toothed pulley is provided at an end portion of the crankshaft, and a timing chain is stretched on the toothed pulley. Moreover, this timing chain is surrounded by a timing chain cover (hereinafter referred to as the TCC). That is, the TCC is installed on the front side of the cylinder block 110. The TCC surrounds the timing chain in such a size as to include the drain port 116 as well. Therefore, the lubricating oil drained from the drain port 116 flows into the TCC, and reaches the crankcase 120. For example, the crankcase 120 may be provided with an oil passage connected to the inside of the crankcase 120, and the lubricating oil that has flowed into the TCC may be returned into the crankcase 120 via the oil passage.

As shown in FIG. 2, the internal combustion engine 10 is equipped with two superchargers (hereinafter referred to as turbochargers) 210 and 220. That is, the internal combustion engine 10 is a so-called V-eight twin-turbo engine. Incidentally, although the internal combustion engine 10 is equipped with the two turbochargers 210 and 220 in the present embodiment, it is sufficient for the internal combustion engine 10 to be equipped with one of the turbochargers 210 and 220. That is, the internal combustion engine 10 may be a so-called V-eight single turbo engine. Besides, the two turbochargers 210 and 220 are installed on the cylinder block 110. However, the turbochargers 210 and 220 may not be absolutely required to be installed on the cylinder block 110. For example, the turbochargers 210 and 220 may be installed beside the cylinder block 110.

One end of an oil feed pipe 211 is connected to the turbocharger 210, and one end of an oil feed pipe 221 is connected to the turbocharger 220. In concrete terms, the one end of the oil feed pipe 211 is connected to an oil feed port of a bearing housing with which the turbocharger 210 is equipped. The one end of the oil feed pipe 221 is connected to an oil feed port of a bearing housing with which the turbocharger 220 is equipped. Lubricating oil flows through the oil feed pipes 211 and 221. Accordingly, lubricating oil is supplied to the bearing housings via the oil feed ports respectively. Lubricating oil lubricates bearings of a turbine shaft supported by the bearing housings respectively.

On the other hand, the other end of the oil feed pipe 211 may be connected to the cylinder block 110, or may be connected to the left cylinder head (not shown) placed on the four cylinders 111, 112, 113, and 114. Oil passages are provided both inside the cylinder block 110 and inside the left cylinder head respectively, so the other end of the oil feed pipe 211 may be connected to one of the oil passages. It should be noted herein that the other end of the oil feed pipe 211 is more desired to be connected to the left cylinder head than to be connected to the cylinder block 110. In comparison with the case where the other end of the oil feed pipe 211 is connected to the cylinder block 110, a flow passage for lubricating oil is shorter, so the flow rate of lubricating oil can be made lower. As a result, the pressure loss of the oil feed pipe 211 can be suppressed. Incidentally, the oil feed pipe 221 is basically identical to the oil feed pipe 211, and hence will not be described further.

One end of a drain pipe 212 is connected to the turbocharger 210, and one end of a drain pipe 222 is connected to the turbocharger 220. In concrete terms, the one end of the drain pipe 212 is connected to an oil drain port of the bearing housing with which the turbocharger 210 is equipped. The one end of the drain pipe 222 is connected to an oil drain port of the bearing housing with which the turbocharger 220 is equipped. The lubricating oil that has finished lubricating the bearings flows through the drain pipes 212 and 222 respectively. That is, the lubricating oil in the turbocharger 210 is drained from the drain pipe 212, and the lubricating oil in the turbocharger 220 is drained from the drain pipe 222.

Figure 3:
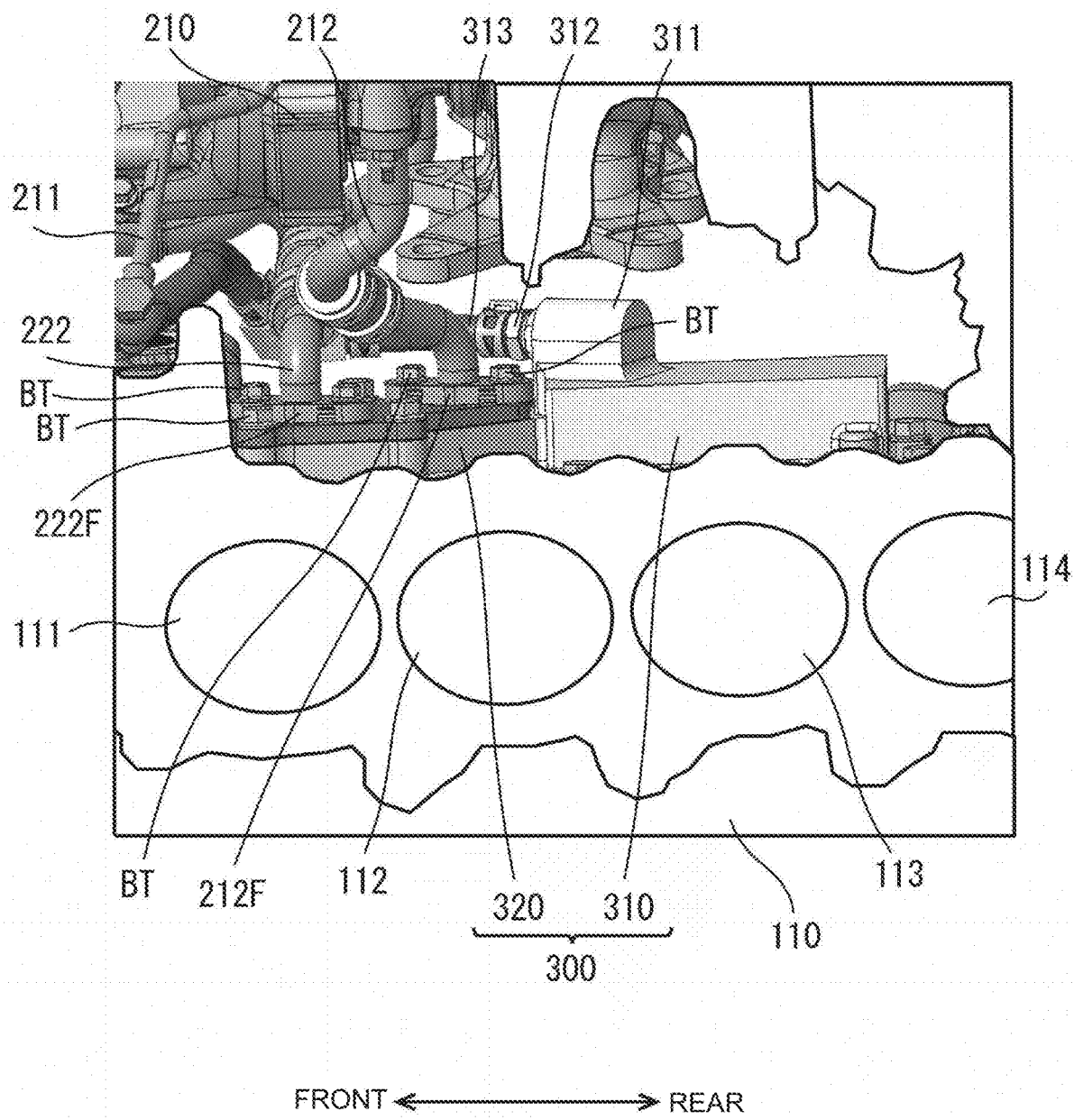
FIG. 3 is an exemplary partially enlarged perspective view of the internal combustion engine.

FIG. 3 is an exemplary partially enlarged perspective view of the internal combustion engine 10. A region surrounded by a broken line frame X shown in FIG. 2 is shown in FIG. 3. As shown in FIG. 3, the internal combustion engine 10 is equipped with a PCV separator 300. The PCV separator 300 is installed between the four cylinders 111, 112, 113, and 114 arranged in line on the left side of the cylinder block 110, and the four cylinders (not shown) arranged in line on the right side (on the other side of the sheet) of the cylinder block 110. The PCV separator 300 is fixed and attached to the cylinder block 110 through the use of a plurality of bolts.

The PCV separator 300 includes a separator portion 310 and an oil flow portion 320. The separator portion 310 separates an oil component contained in blowby gas, and returns the blowby gas from which the oil component has been separated to an intake system of the internal combustion engine 10. Although the details will be described later, one side of a PCV valve 312 is connected to a valve attachment hole 311 of the separator portion 310. One end of a PCV hose 313 is connected to the other side of the PCV valve 312. The other end of the PCV hose 313 is connected to the intake system of the internal combustion engine 10. Therefore, the blowby gas from which the oil component has been separated is returned to the intake system of the internal combustion engine 10, via the PCV valve 312 and the PCV hose 313.

On the other hand, the oil flow portion 320 is connected to the other end of the drain pipe 212 and the other end of the drain pipe 222. In concrete terms, the drain pipe 212 is connected to the oil flow portion 320 by fastening a flange 212F provided at the other end of the drain pipe 212 to the oil flow portion 320 with a plurality of bolts BT. The drain pipe 222 is connected to the oil flow portion 320 by fastening a flange 222F provided at the other end of the drain pipe 222 to the oil flow portion 320 with the bolts BT. Incidentally, the details of the oil flow portion 320 will be described hereinafter in detail.

Figure 4:
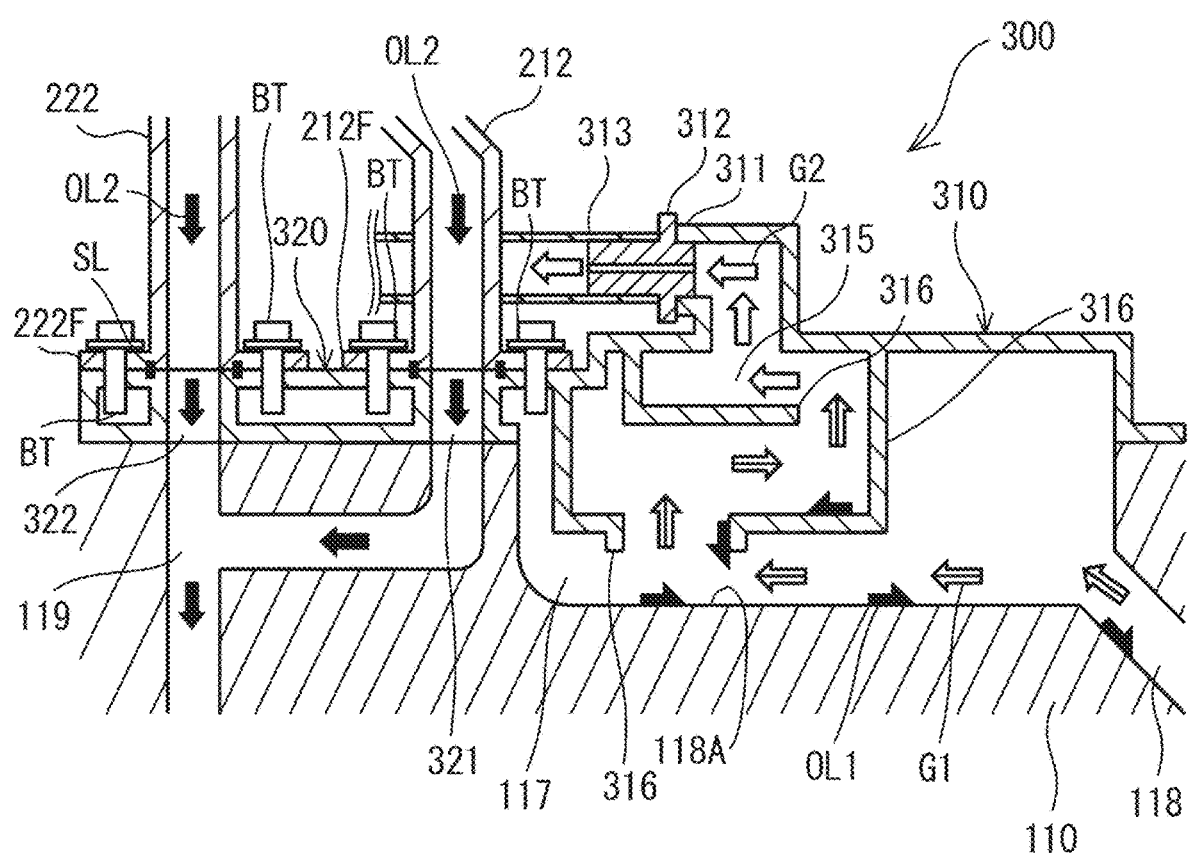
FIG. 4 is a view schematically showing a cross-section of a PCV separator.

FIG. 4 is a view schematically showing a cross-section of the PCV separator 300. As described above, the PCV separator 300 is a single molded item that integrally includes the separator portion 310 and the oil flow portion 320. The separator portion 310 includes a separator chamber 315 therein. As shown in FIG. 4, the cylinder block 110 includes a void portion 117 that is recessed like a tub, and the separator chamber 315 is formed integrally with the void portion 117. A plurality of inner walls 316 assuming various shapes are arranged integrally with the separator portion 310 in the separator chamber 315.

A flow passage 118 of the cylinder block 110 is connected to the inside of the crankcase 120. Blowby gas G1 that has flowed from the flow passage 118 into the void portion 117 flows toward the PCV valve 312 while meandering. The blowby gas G1 collides with the inner walls 316 before reaching the PCV valve 312 after leaving the flow passage 118. At respective collision locations of the inner walls 316 with which the blowby gas G1 repeatedly collides, an oil component OL1 contained in the blowby gas G1 is separated from the blowby gas G1. Thus, blowby gas G2 obtained after separating the oil component OL1 from the blowby gas G1 reaches the PCV valve 312. The blowby gas G2 flows into the PCV hose 313 via the PCV valve 312. On the other hand, the oil component OL1 separated from the blowby gas G1 flows along a bottom surface 118A of the cylinder block 110 constituting the void portion 117, and returns to the inside of the crankcase 120 through the flow passage 118. In this manner, the oil component OL1 is separated from the blowby gas G1 at the separator portion 310.

The oil flow portion 320 includes two oil passages 321 and 322. In the case where the internal combustion engine 10 is equipped with one of the turbochargers 210 and 220, the oil flow portion 320 may be equipped with one of the two oil passages 321 and 322. At least one of the two oil passages 321 and 322 may penetrate the separator chamber 315, but it is more desirable that both the oil passages 321 and 322 be provided in a region that does not penetrate the separator chamber 315, separately from the separator chamber 315. In comparison with the case where at least one of the two oil passages 321 and 322 penetrates the separator chamber 315, the separator chamber 315 is less likely to become narrow, and separation of the oil component OL1 is less likely to be hampered. The oil passage 321 is connected to the other end of the drain pipe 212. Accordingly, lubricating oil OL2 flowing through the interior of the drain pipe 212 flows from an outlet of the drain pipe 212 into the oil passage 321. That is, one opening of the oil passage 321 corresponds to an inlet for the lubricating oil OL2 flowing through the interior of the drain pipe 212. By the same token, the oil passage 322 is connected to the other end of the drain pipe 222. Accordingly, the lubricating oil OL2 flowing through the interior of the drain pipe 222 flows from an outlet of the drain pipe 222 into the oil passage 322. That is, one opening of the oil passage 322 corresponds to an inlet for the lubricating oil OL2 flowing through the interior of the drain pipe 222.

The two oil passages 321 and 322 are connected to an oil passage 119 that is included by the cylinder block 110. More specifically, the oil passage 119 is equipped with two openings on a connection surface between the cylinder block 110 and the oil flow portion 320, one of the two openings is connected to the oil passage 321, and the other opening is connected to the oil passage 322. Accordingly, the lubricating oil OL2 that has flowed out from the oil passage 321 flows from one of the two openings into the oil passage 119, and the lubricating oil OL2 that has flowed out from the oil passage 322 flows from the other opening into the oil passage 119. That is, one of the two openings with which the oil passage 119 is equipped corresponds to the inlet for the lubricating oil OL2 that has flowed out from the oil passage 321, and the other of the two openings with which the oil passage 119 is equipped corresponds to the inlet for the lubricating oil OL2 that has flowed out from the oil passage 322.

As shown in FIG. 4, the lubricating oil OL2 that has flowed in from one of the openings and the lubricating oil OL2 that has flowed in from the other opening merge with each other inside the oil passage 119. After merging, the lubricating oil OL2 flows through the interior of the oil passage 119, and is drained from an outlet of the oil passage 119. The outlet of the oil passage 119 corresponds to the drain port 116 (see FIG. 2). Accordingly, the lubricating oil OL2 is drained from the drain port 116.

Incidentally, a ring-shaped sealing material SL is disposed on a connection surface between the flange 222F of the drain pipe 222 and the oil flow portion 320. The sealing material SL is also disposed on a connection surface between the flange 212F of the drain pipe 212 and the oil flow portion 320. The sealing material SL may be realized by a coating agent such as a formed-in place gasket (FIPG), or a solid gasket such as a rubber gasket. Thus, the lubricating oil OL2 can be restrained from leaking out from the connection surface between the flange 222F and the oil flow portion 320, and the connection surface between the flange 212F and the oil flow portion 320.

As described above, the internal combustion engine 10 is equipped with the turbochargers 210 and 220, the drain pipes 212 and 222, the cylinder block 110, and the PCV separator 300. Both the drain pipes 212 and 222 drain the lubricating oil OL2 in the turbochargers 210 and 220 respectively. The cylinder block 110 includes the oil passage 119. The PCV separator 300 includes the oil passages 321 and 322 that are connected to the outlets of the drain pipes 212 and 222 respectively and to an inlet of the oil passage 119.

Owing to this configuration, if the PCV separator 300 is disconnected from the cylinder block 110, the lubricating oil OL2 leaks out from the oil passages 321 and 322 and the oil passage 119, and is rapidly consumed. Besides, when the drain pipes 212 and 222 are disconnected from the PCV separator 300, the lubricating oil OL2 leaks out from the drain pipes 212 and 222 and the oil passages 321 and 322, and is rapidly consumed. The lubricating oil OL2 that has leaked out falls from the vehicle 12 mounted with the internal combustion engine 10 (e.g., an opening of an undercover) onto the ground and adheres thereto. Accordingly, the driver 11 of the vehicle 12 can notice that the PCV separator 300 has been disconnected, by visually confirming the lubricating oil OL2 that has adhered to the ground. In this manner, the driver 11 can be made aware that the PCV separator 300 has been disconnected, even when the internal combustion engine 10 is not provided with a sensor for detecting an oil amount, an oil pressure, or the like of the lubricating oil OL2.

On the other hand, the following configuration may be adopted to make the driver 11 aware that the PCV separator 300 has been disconnected. In concrete terms, a sensor for detecting an oil level in the oil pan 130 is installed in the oil pan 130 that stores the lubricating oil OL2. Moreover, a malfunction indicator lamp (MIL) disposed in an instrumental panel of the vehicle 12 may be lit when the sensor detects an abnormal oil level. This configuration can also make the driver 11 aware that the PCV separator 300 has been disconnected.

Incidentally, the foregoing embodiment has been described using the V-eight engine as an example of the internal combustion engine 10. However, the number of cylinders arranged in the cylinder block 110 is not limited in particular. For example, the internal combustion engine 10 may be, for example, a V-six engine. Besides, the cylinders may not necessarily be arranged in the V-shape, but may be arranged in line. That is, an in-line four-cylinder engine, an in-line six-cylinder engine, or the like may be adopted as the internal combustion engine 10. In this case, the PCV separator 300 can be attached to a lateral wall extending along the direction of arrangement of the cylinders arranged in line.

Furthermore, although not shown in the drawings, even in the case of an internal combustion engine that is equipped with a cylinder head including a first flow passage through which a fluid such as coolant or lubricating oil flows, a cylinder block including a second flow passage through which the fluid flows, and a PCV separator including a third flow passage that is connected to an outlet of the first flow passage or the second flow passage and an inlet of the first flow passage or the second flow passage, it is possible to detect that the PCV separator has been disconnected. That is, the third flow passage of the PCV separator serves as a detour for the fluid. Therefore, if the PCV separator is disconnected, the fluid leaks out from the outlet of the first flow passage or the second flow passage, or the like. Thus, as is the case with the foregoing description, the driver 11 can be made aware that the PCV separator has been disconnected.

Although the preferred embodiments of the present disclosure have been described above in detail, the applicable embodiment is not limited to these specific embodiments thereof, but can be subjected to various modifications and alterations within the scope of the gist of the present disclosure described in the claims.

What is claimed is:

1. A vehicular internal combustion engine comprising:
a supercharger;
a drain pipe for draining lubricating oil in the supercharger;
a cylinder block including a first oil passage;
a positive crankcase ventilation (PCV) separator including a second oil passage that is connected to an outlet of the drain pipe and an inlet of the first oil passage;
an oil pan that stores the lubricating oil;
a sensor that detects an oil level in the oil pan;
a first malfunction indicator lamp arranged in an instrument panel of a vehicle is lit when the sensor detects an abnormal oil level; and
a second malfunction indicator lamp in the instrument panel of the vehicle is lit in response to the PCV separator being disconnected.

2. The vehicular internal combustion engine according to claim 1, wherein
the PCV separator includes a separator chamber that separates an oil component from oil mist in blowby gas, and
the second oil passage is provided in a region that does not penetrate the separator chamber, separately from the separator chamber.

3. The vehicular internal combustion engine according to claim 1, wherein
the lubricating oil is oil for lubricating a bearing of the supercharger.

4. The vehicular internal combustion engine according to claim 1, further comprising:
a cylinder head that is placed on the cylinder block; and
an oil feed pipe that is connected to a third oil passage provided in the cylinder head, wherein
the lubricating oil is supplied from the oil feed pipe to the supercharger.

5. A vehicular internal combustion engine comprising:
a supercharger;
a drain pipe for draining lubricating oil in the supercharger;
a cylinder block including a first oil passage; and
a positive crankcase ventilation (PCV) separator including a second oil passage that is connected to an outlet of the drain pipe and an inlet of the first oil passage, wherein
the PCV separator includes a separator chamber that separates an oil component from oil mist in blowby gas, and
the second oil passage is provided in a region that does not penetrate the separator chamber, separately from the separator chamber, and
the lubricating oil is oil for lubricating a bearing of the supercharger.

6. A vehicular internal combustion engine comprising:
a supercharger;
a drain pipe for draining lubricating oil in the supercharger;
a cylinder block including a first oil passage; and
a positive crankcase ventilation (PCV) separator including a second oil passage that is connected to an outlet of the drain pipe and an inlet of the first oil passage; and
an oil pan that stores the lubricating oil; and
a sensor that detects an oil level in the oil pan, wherein
a malfunction indicator lamp arranged in an instrument panel of a vehicle is lit when the sensor detects an abnormal oil level, wherein
the PCV separator includes a separator chamber that separates an oil component from oil mist in blowby gas, and
the second oil passage is provided in a region that does not penetrate the separator chamber, separately from the separator chamber.

* * * * *